United States Patent
Esseghir et al.

(10) Patent No.: US 12,030,220 B2
(45) Date of Patent: *Jul. 9, 2024

(54) METHOD OF MAKING A HOMOGENEOUS MIXTURE OF POLYOLEFIN SOLIDS AND CARBON SOLIDS

(71) Applicant: Dow Global Technologies LLC, Midland, MI (US)

(72) Inventors: Mohamed Esseghir, Lawrenceville, NJ (US); Saurav S. Sengupta, Gilbertsville, PA (US)

(73) Assignee: Dow Global Technologies LLC, Midland, MI (US)

( * ) Notice: Subject to any disclaimer, the term of this patent is extended or adjusted under 35 U.S.C. 154(b) by 309 days.

This patent is subject to a terminal disclaimer.

(21) Appl. No.: 17/635,724

(22) PCT Filed: Aug. 26, 2020

(86) PCT No.: PCT/US2020/047937
§ 371 (c)(1),
(2) Date: Feb. 16, 2022

(87) PCT Pub. No.: WO2021/041502
PCT Pub. Date: Mar. 4, 2021

(65) Prior Publication Data
US 2022/0281138 A1    Sep. 8, 2022

Related U.S. Application Data

(60) Provisional application No. 63/045,923, filed on Jun. 30, 2020, provisional application No. 62/893,258, filed on Aug. 29, 2019, provisional application No. 62/893,249, filed on Aug. 29, 2019.

(51) Int. Cl.
| | | |
|---|---|---|
| B29B 7/08 | (2006.01) | |
| B29B 7/82 | (2006.01) | |
| B29B 7/90 | (2006.01) | |
| C08K 3/04 | (2006.01) | |
| C09D 123/06 | (2006.01) | |
| B29K 23/00 | (2006.01) | |
| B29K 105/00 | (2006.01) | |
| B29K 105/16 | (2006.01) | |
| B29K 507/04 | (2006.01) | |

(52) U.S. Cl.
CPC ............... *B29B 7/08* (2013.01); *B29B 7/823* (2013.01); *B29B 7/90* (2013.01); *C08K 3/04* (2013.01); *C09D 123/06* (2013.01); *B29K 2023/0625* (2013.01); *B29K 2105/0044* (2013.01); *B29K 2105/162* (2013.01); *B29K 2507/04* (2013.01); *B29K 2995/0005* (2013.01)

(58) Field of Classification Search
None
See application file for complete search history.

(56) References Cited

U.S. PATENT DOCUMENTS

| | | | |
|---|---|---|---|
| 6,565,784 | B1 | 5/2003 | Esseghir et al. |
| 7,188,993 | B1 | 3/2007 | Howe et al. |
| 7,695,817 | B2 | 4/2010 | Lin et al. |
| 8,124,309 | B2 | 2/2012 | Lai et al. |
| 8,435,714 | B2 | 5/2013 | Lai et al. |
| 8,680,177 | B2 | 3/2014 | Starling |
| 8,889,331 | B2 | 11/2014 | Qiu et al. |
| 9,223,236 | B2 | 12/2015 | Qiu et al. |
| 9,593,919 | B2 | 3/2017 | Neff |
| 9,926,427 | B2 | 3/2018 | Zhamu et al. |
| 9,957,360 | B2 | 5/2018 | Hanan et al. |
| 2002/0042463 | A1* | 4/2002 | Lundgard .......... C08G 18/0876 524/487 |
| 2005/0148703 | A1* | 7/2005 | Barone .................. C08L 89/04 524/100 |
| 2010/0137481 | A1* | 6/2010 | Shen ...................... C08F 255/02 524/110 |
| 2011/0306698 | A1* | 12/2011 | Pletcher ................ C08K 5/524 524/110 |
| 2012/0098163 | A1* | 4/2012 | vila-Orta .................. B29B 7/36 264/444 |

(Continued)

FOREIGN PATENT DOCUMENTS

| | | | | |
|---|---|---|---|---|
| WO | WO-2011111612 A1 | * | 9/2011 | ............. B32B 23/00 |
| WO | WO-2019124233 A1 | * | 6/2019 | ............ B01J 13/185 |

(Continued)

OTHER PUBLICATIONS

Lee, "Toward Absolute Chemical Composition Distribution Measurement of Polyolefins by High-Temperature Liquid Chromatography Hyphenated with Infrared Absorbance and Light Scattering Detectors", 2014, vol. 86, No. 17, p. 8649-8656.
PCT/US2020/047937, International Search Report and Written Opinion with a mailing date of Nov. 25, 2020.
Resodyn, Blending Polyethylene Pellets with Carbon Black, 2018.
Sanchez, "Assessment of extrusion-sonication process on flame retardant polypropylene by rheological characterization", 2016, vol. 3, No. 2, p. 620-633.

(Continued)

*Primary Examiner* — Yung-Sheng M Tsui

(57) ABSTRACT

A method of making a homogeneous mixture of polyolefin solids and carbon solids without melting the polyolefin solids during the making. The method comprises applying acoustic energy at a frequency of from 20 to 100 hertz to a heterogeneous mixture comprising the polyolefin solids and the carbon solids for a period of time sufficient to substantially intermix the polyolefin solids and the carbon solids together while maintaining temperature of the heterogeneous mixture below the melting temperature of the polyolefin solids, thereby making the homogeneous mixture without melting the polyolefin solids.

10 Claims, No Drawings

(56) References Cited

U.S. PATENT DOCUMENTS

| | | | |
|---|---|---|---|
| 2012/0130015 A1 | 5/2012 | Horn et al. | |
| 2013/0149453 A1* | 6/2013 | Romick | B32B 15/085 |
| | | | 524/504 |
| 2013/0260310 A1 | 10/2013 | Wang et al. | |
| 2017/0253721 A1* | 9/2017 | Yoshida | B29B 7/86 |
| 2018/0272565 A1 | 9/2018 | Zhamu et al. | |
| 2019/0245232 A1 | 8/2019 | Kim et al. | |

FOREIGN PATENT DOCUMENTS

| | | |
|---|---|---|
| WO | 2021041497 A1 | 3/2021 |
| WO | 2021041498 A1 | 3/2021 |
| WO | 2021041501 A1 | 3/2021 |

OTHER PUBLICATIONS

Tarverdi, "Enhanced Dispersion of Particle Additive Into Plymers Using Twin Screw Extrusion with Ultrasound Assistance", 2017, p. 1058-1062.

Silicone Oil, Chinese Academy of Sciences, 1973, pp. 189-190.

Office Action from corresponding Chinese Application No. 202080060318.2 dated Apr. 16, 2024.

\* cited by examiner

METHOD OF MAKING A HOMOGENEOUS MIXTURE OF POLYOLEFIN SOLIDS AND CARBON SOLIDS

INTRODUCTION

Patents and patent application publications in or about the field include U.S. Pat. Nos. 6,565,784; 7,188,993 B1; 7,695,817 B2; 8,124,309 B2; 8,435,714 B2; 8,680,177 B2; 8,889,331 B2; 9,223,236 B2; 9,593,919 B2; 9,926,427 B2; 9,957,360 B2. Non-patent publications in or about the field include *Assessment of extrusion-sonication process on flame retardant polypropylene by rheological characterization*, by G. Sanchez-Olivares, et al. AIMS Materials Science, 2016; vol. 3, no. 2, pages 620 to 633; and *ENHANCED DISPERSION OF PARTICLE ADDITIVE INTO POLYMERS USING TWIN SCREW EXTRUSION WITH ULTRASOUND ASSISTANCE*, by K. Tarverdi, et al., SPE ANTEC Anaheim 2017, pages 1058 to 1062.

Prior mixing methods rely on mechanical blending of solids (e.g., in a stirred tank device) or melts (e.g., in a twin-screw extruder device) of polyolefins with solid additives.

FIELD

Mixing polyolefins with additives.

SUMMARY

Heretofore it had been thought that thorough mixing of polyolefin solids with carbon solids required melting the polyolefin solids to form a liquid melt, into which the carbon solids would then be intermixed by mechanical means.

We have discovered a method of making a homogeneous mixture of polyolefin solids and carbon solids without melting the polyolefin solids during the making step. The method comprises applying acoustic energy at a frequency of from 20 to 100 hertz to a heterogeneous mixture comprising the polyolefin solids and the carbon solids for a period of time sufficient to substantially intermix the polyolefin solids and the carbon solids together while maintaining temperature of the heterogeneous mixture (and, for that matter, the temperature of the homogeneous mixture made therefrom) below the melting temperature of the polyolefin solids, thereby making the homogeneous mixture without melting the polyolefin solids.

The method achieves thorough intermixing without melting the polyolefin solids.

DETAILED DESCRIPTION

A method of making a homogeneous mixture of polyolefin solids and carbon solids without melting the polyolefin solids during the making. The method comprises applying acoustic energy at a frequency of from 20 to 100 hertz (Hz) to a heterogeneous mixture comprising the polyolefin solids and the carbon solids for a period of time sufficient to substantially intermix (thoroughly or completely homogenize) the polyolefin solids and the carbon solids together while maintaining temperature of the heterogeneous mixture (and, for that matter, the temperature of the homogeneous mixture made therefrom) below the melting temperature of the polyolefin solids, thereby making the homogeneous mixture without melting the polyolefin solids.

Additional inventive aspects follow; some are numbered below for ease of reference.

Aspect 1. A method of making a homogeneous mixture of polyolefin solids and carbon solids without melting the polyolefin solids during the making, the method comprising applying acoustic energy at a frequency of from 20 to 100 hertz (Hz) to a heterogeneous mixture comprising (A) polyolefin solids and (B) carbon solids for a period of time sufficient to substantially intermix (thoroughly or completely homogenize) the (A) polyolefin solids and the (B) carbon solids together while maintaining temperature of the heterogeneous mixture (and, for that matter, the temperature of the homogeneous mixture made therefrom) below the melting temperature of the (A) polyolefin solids, thereby making the homogeneous mixture without melting the (A) polyolefin solids; wherein the (A) polyolefin solids are from 95.0 to 99.9 weight percent (wt %) and the (B) carbon solids are from 0.1 to 5.0 wt %, respectively, of the combined weights of the constituents (A) and (B). The total weight of all the constituents of the heterogeneous mixture is 100.0 wt % and the total weight of all constituents of the homogeneous mixture is 100.0 wt %. The method may further comprise the limitation wherein the heterogeneous mixture is not mechanically agitated (not mixed by mechanical means) during the applying acoustic energy step.

Aspect 2. The method of aspect 1 wherein the applying acoustic energy step is characterized by any one of limitations (i) to (v): (i) the frequency is from 50 to 70 Hz, alternatively from 55 to 65 Hz, alternatively from 58 to 62 Hz, alternatively from 59 to 61 Hz; (ii) the period of time is from 0.5 minute to 4 hours, alternatively from 0.5 minute to 2 hours, alternatively from 1 minute to 60 minutes, alternatively from 1 minute to 10 minutes; (iii) both (i) and (ii); (iv) the maintaining temperature of the heterogeneous mixture below the melting temperature of the (A) polyolefin solids comprises maintaining temperature of the heterogeneous mixture (and, for that matter, the temperature of the homogeneous mixture made therefrom) at from −20° to 109° C., alternatively from 10° to 109° C., alternatively from 15° to 99° C., alternatively from −20° to 50.0° C., alternatively from 20.0° to 39.9° C., alternatively from 20.0° to 29.9° C. (e.g., 25° C.±3° C.); and (v) both (iv) and any one of (i) to (iii). The temperature may be ambient outdoor temperature. The intensity is sufficient to move materials with sufficient amplitude that is effective for mixing without mechanical agitation. An acoustic mixer device may be used to perform the applying acoustic energy step, wherein the frequency is set by the operator of the acoustic mixer device.

Aspect 3. The method of aspect 1 or 2 wherein the (A) polyolefin solids are characterized by a physical form (i.e., solid particulate form) that is a powder, granules, pellets, or a blend of any two or more thereof, and by a melting temperature that is from 61° to 180° C., alternatively from 90° to 180° C., alternatively from 110° to 174° C., alternatively from 120° to 180° C.; and the (B) carbon solids are characterized by a physical form that is a powder, granules, fibers, tubes, or a blend of any two or more thereof, and by a melting temperature that is from 2,400° to 4,400° C.

Aspect 4. The method of any one of aspects 1 to 3 characterized by any one of limitations (i) to (iii): (i) the polyolefin of the (A) polyolefin solids consists essentially of one or more ethylene-based polymers; (ii) the (B) carbon solids are graphite, carbon black, carbon nanotubes, or a blend of any two or more thereof; and (iii) both (i) and (ii).

Aspect 5. The method of aspect 4 wherein the ethylene-based polymer is a linear low-density polyethylene (LLDPE) or a combination of two different LLDPEs; and wherein the (B) carbon solids are carbon black. In other embodiments the ethylene-based polymer is a low-density polyethylene (LDPE), a combination of an LLDPE and an LDPE, or a combination of two different LDPEs.

Aspect 6. The method of any one of aspects 1 to 5 wherein the heterogeneous mixture further comprises one or more additives that is/are not the (A) polyolefin solids or the (B) carbon solids, and the applying acoustic energy step comprises applying acoustic energy at a frequency of from 20 to 100 hertz (Hz) to the heterogeneous mixture comprising the (A) polyolefin solids, the (B) carbon solids, and the one or more additives for a period of time sufficient to substantially intermix (thoroughly or completely homogenize) the (A) polyolefin solids, the (B) carbon solids, and the one or more additives together while maintaining temperature of the heterogeneous mixture (and, for that matter, the temperature of the homogeneous mixture made therefrom) below the melting temperature of the (A) polyolefin solids, thereby making the homogeneous mixture further comprising the one or more additives, without melting the (A) polyolefin solids.

Aspect 7. The method of aspect 6 wherein at least one, alternatively all but one, alternatively each of the one or more additives that is not constituents (A) or (B) is independently a liquid additive or particulate solid additive independently selected from additives (C) to (I): a liquid or particulate solid (C) antioxidant; a liquid or particulate solid (D) colorant; a liquid or particulate solid (E) scorch retardant; a liquid or particulate solid (F) stabilizer for stabilizing the homogeneous mixture against effects of ultraviolet light and/or heat; a liquid or particulate solid (G) processing aid; a liquid or particulate solid (H) flame retardant; and (I) a solid filler.

Aspect 8. The method of aspect 7 wherein the one or more additives comprises at least one particulate solid additive, and wherein the at least one particulate solid additive independently is selected from particulate solid additives $(C)_{sol}$ to $(I)_{sol}$: $(C)_{sol}$ a solid antioxidant (e.g., (i) 2,2'-thiobis (6-t-butyl-4-methylphenol) (e.g., LOWINOX TBP-6); (ii) 3,5-bis(1,1-dimethylethyl)-4-hydroxybenzenepropanoic acid 2,2'-thiodiethanediyl ester having a melting point of 78° C. (e.g., IRGANOX 1035, CAS Number 41484-35-9); (iii) 4,4'-thiobis(2-t-butyl-5-methylphenol) having a melting point of from 160° to 163° C. (also known as 4,4'-thiobis (6-tert-butyl-m-cresol), CAS No. 96-69-5, e.g., LOWINOX TBM-6); $(D)_{sol}$ a solid colorant that is not the (B) carbon solids (e.g., $(D)_{sol}$ may be $TiO_2$); $(E)_{sol}$ a solid scorch retardant (e.g., a hydroquinone); $(F)_{sol}$ a solid stabilizer for (i) stabilizing the homogeneous mixture against effects of ultraviolet light (UV stabilizer) (e.g., a solid hindered amine light stabilizer (HALS) such as, e.g., poly[[6-[(1,1,3,3-tetramethylbutyl)amino]-1,3,5-triazine-2,4-diyl][(2,2,6,6-tetramethyl-4-piperidinyl)imino]-1,6 hexanediyl[(2,2,6,6-tetramethyl-4-piperidinyl)imino]]) sold as Chimassorb 944) or for (ii) stabilizing the heterogeneous mixture and homogeneous mixture against the effects of heat (heat stabilizer) (e.g., a poly(1,2-dihydro-2,2,4-trimethylquinoline) solid having an average molecular weight of 874 g/mol and a softening temperature of 128° C. (CAS No. 26780-96-1; e.g., Naugard Super Q)); $(G)_{sol}$ a solid processing aid (e.g., (i) N,N'-ethylene bis(stearamide) e.g., Kemamide W-40; or (ii) solid fluorinated polyolefin polymer provided as a granular solid and having a melting temperature from 110° to 126° C.; a melt flow index (265° C., 5.0 kg) from 15.0 to 25.0 g/10 min.; a particle size 98% less than 2,400 μm (e.g., 3M Dynamar FX-5912 from 3M Corporation), and typical use level from 200 to 1,000 weight parts per million (ppmw) based on amount of the (A) polyolefin solids); $(H)_{sol}$ a solid flame retardant (e.g., a metal hydrate); and $(I)_{sol}$ a solid filler (e.g., a surface-treated fumed silica). Alternatively or additionally, the at least one particulate solid additive may be a solid organic peroxide (e.g., dicumyl peroxide having a melting point of 40.6° C.) or a solid crosslinking coagent (e.g., triallyl isocyanurate).

Aspect 9. The method of aspect 7 or 8 wherein the one or more additives comprises at least one liquid additive, and wherein the at least one liquid additive independently is selected from liquid additives $(C)_{liq}$ to $(H)_{liq}$: $(C)_{liq}$ a liquid antioxidant (e.g., 2-methyl-4,6-bis(octylthiomethyl)phenol e.g., IRGASTAB Cable KV 10); $(D)_{liq}$ a liquid colorant (e.g., a liquid dye); $(E)_{liq}$ a liquid scorch retardant; $(F)_{liq}$ a liquid stabilizer for stabilizing the homogeneous mixture against effects of ultraviolet light (UV stabilizer), such as a liquid hindered amine light stabilizer (HALS); $(G)_{liq}$ a liquid processing aid (e.g., (i) mineral oil such as a paraffin liquid having a kinematic viscosity of 33.5 centistokes (cSt) and/or) or a polydimethylsiloxane (PDMS) fluid (e.g., a PDMS fluid having, depending upon the grade, a kinematic viscosity of from 50 to 60,000 cSt, e.g., XIAMETER PMX-200 silicone fluid from The Dow Chemical Company, e.g., XIAMETER PMX-200 silicone fluid having kinematic viscosity of 50 cSt.); and $(H)_{liq}$ a liquid flame retardant (e.g., a brominated polystyrene; a brominated rubber a poly(vinyl bromide), a poly(vinylidene bromide), a poly(brominated-alkyl acrylate), a poly(alkyl brominated-acrylate), or a brominated butadiene-styrene copolymer). The $(E)_{liq}$ liquid scorch retardant may be 2,4-diphenyl-4-methyl-1-pentene (also known as alpha-methyl styrene dimer or AMSD) or a liquid hydrolyzable silane (e.g., octyltriethoxysilane (OTES) or vinyltrimethoxysilane (VTMS)). The $(E)_{liq}$ may be a compound of formula $RSi(X)_3$, wherein R is $(C_1-C_{10})$ alkyl, $(C_2-C_{10})$alkenyl, $(C_2-C_{10})$alkynyl, or X, and each X independently is $(C_1-C_{10})$alkoxy, $(C_1-C_{10})$carboxy, di$((C_1-C_{10})$alkyl)amino, or $(C_1-C_{10})$oximo. Alternatively or additionally, the at least one liquid additive may be a liquid organic peroxide (e.g., tert-butyl peroxyacetate), a liquid crosslinking coagent (e.g., diallyl fumarate), or a liquid moisture generator agent (e.g., a hydroxyl-terminated polydimethylsiloxane fluid). Each of the at least one liquid additive independently has a freezing point less than 20.0° C., alternatively less than 15° C., alternatively less than 5° C. The freezing point of each of the at least one liquid additive independently may be at least −80° C., alternatively at least −50° C., alternatively at least −10° C. In some embodiments there are at least 2 liquid additives.

Aspect 10. The method of any one of aspects 4 to 9 characterized by any one of limitations (i) to (v): (i) the (A) polyolefin solids comprises a particle blend of first solids of a first linear low-density polyethylene (first LLDPE) and second solids of a second LLDPE that is different than the first LLDPE; (ii) the (B) carbon solids comprise a carbon black; (iii) the one or more additives comprise one or two particulate solid (C) antioxidants; (iv) the one or more additives comprise a particulate solid (F) heat stabilizer; and (v) the one or more additives comprise one or two (G) processing aids independently selected from a particulate solid (G) processing aid and a (G) liquid processing aid. In some embodiments this aspect of the method is characterized by any one of limitation combinations (vi) to (xiii); (vi) both limitations (iii) and (iv); (vii) both limitations (iii) and (v); (viii) both limitations (iv) and (v); (ix) each of limitations (iii) to (v); (x) limitation (i) and any one of limitations (iii) to (ix); (xii) limitation (ii) and any one of limitations (iii) to (x); and (xiii) each of limitations (i) to (v). In some embodiments the (A) polyolefin solids further comprise a third solids of a medium-density polyethylene.

Aspect 11. The method of any one of aspects 1 to 10 further comprising a step of melting the (A) polyolefin solids of the homogeneous mixture to make a homogeneous melt mixture comprising the (B) carbon solids, one or more additives, if present, and a melt of the (A) polyolefin solids; shaping the homogeneous melt mixture to give a shaped melt mixture; and cooling the shaped melt mixture to give a shaped solid. The melting step occurs after the applying acoustic energy step.

Aspect 12. The method of aspect 11 wherein the shaping step comprises extruding the melt mixture as a coating (e.g., a jacketing composition) onto a conductive core (e.g., a wire, fiber optic, or both), and allowing the coating to solidify to make a coated (e.g., jacketed) conductor comprising the conductive core and a coating-shaped solid at least partially covering (e.g., jacketing) the conductive core.

Aspect 13. A coated conductor made by the method of aspect 12.

Aspect 14. The method of aspect 11 or 12 wherein the heterogenous mixture and the homogeneous mixture made therefrom comprises an organic peroxide, and, optionally, the (E) scorch retardant; the method further comprising curing the homogeneous mixture (e.g., by heating same to a temperature of 100° to 180° C.) to give a crosslinked homogeneous product.

Aspect 15. A crosslinked homogeneous product made by the method of aspect 14.

The method solves a problem of mixing of polyolefin solids with carbon solids without melting the polyolefin solids and, optionally, without using mechanical mixing means. The applying acoustic energy step can achieve such thorough intermixing without melting the polyolefin solids. If desired, the method may be performed without mechanical mixing.

The applying acoustic energy step enables and is effective for thoroughly and rapidly intermixing of the (A) polyolefin solids and the (B) carbon solids without melting the polyolefin solids during the intermixing. This combination of advantages of mixing completeness, mixing speed, and minimizing thermal exposure are discussed below. Embodiments of the method that omit mechanical mixing means beneficially avoid using expensive mechanical mixing equipment and simplify manufacturing operations.

The intermixing of the applying acoustic energy step is thorough because it achieves and makes a homogeneous mixture. In a practical sense achieving the homogeneity may be recognized be visual inspection or by sampling of the mixture as it transitions from a heterogeneous to a homogeneous state, and measuring a property of the sample. For example, homogeneity is achieved when the sampling error of the measurement is negligible or identical compared to the total error of the measurement. All other things being equal, (i) the greater the acoustic energy, the shorter the period of time needed to achieve homogeneity, and vice versa; and (ii) the closer is the frequency to a resonating with the polymer solids, the shorter the period of time needed to achieve homogeneity, and vice versa.

The intermixing of the applying acoustic energy step is rapid because complete intermixing can be achieved in a matter of seconds or minutes, e.g., from 0.5 minute to 10 minutes, alternatively from 1.0 to 5.0 minutes, alternatively from 2 to 4 minutes.

The applying acoustic energy step minimizes thermal exposure of the homogeneous mixture because it converts the heterogeneous mixture to the homogeneous mixture without melting the (A) polyolefin solids. In fact, if desired, may be advantageously conducted at a temperature well below the melting temperature of the (A) polyolefin solids. For example, the applying acoustic energy step may be carried out at a temperature from 0° to 39° C., alternatively from 10° to 34° C., alternatively from 20° to 30° C.

Because the applying acoustic energy step may be conducted at a temperature far below the melting temperature of the (A) polyolefin solids, embodiments of the step may advantageously be conducted in oxygen-containing atmosphere such as air. Oxygen-containing atmospheres may be harmful to conventional melt-mixing or melt-compounding operations wherein exposing a melt of the (A) polyolefin solids containing the (B) carbon solids and optionally additives to air at high temperatures such as 140° to 200° C. could undesirably cause scorch (premature curing, especially when the heterogeneous mixture contains an organic peroxide with or without the (E) scorch retardant) or oxidative-and/or-thermal decomposition of the (A) polyolefin solids and/or additives. Thus, the applying acoustic energy step beneficially maintains the temperature of the (A) polyolefin solids, and of the other constituents of the heterogeneous mixture containing same and the homogeneous mixture made therefrom, below the melting temperature of the (A) polyolefin solids.

Even in embodiments of the method that further comprise the step of melting and extruding the homogeneous mixture to give a shaped article, the homogeneous mixture has had less thermal exposure than has a comparative homogeneous mixture made by melt-mixing or melt-compounding the heterogeneous mixture. This is because it has avoided the melt-mixing/compounding exposure time, which would otherwise have added 10 or more minutes of exposure to temperatures of 140° C. or higher.

Thus, without being bound by theory, it is believed that relative to the comparative homogeneous mixture, the inventive homogeneous mixture may have improved cure properties (e.g., lower hot creep %), improved mechanical properties (e.g., higher tensile strength, greater elongation-at-break), and/or improved heat aging performance.

A technical explanation of how the applying acoustic energy step makes the homogeneous mixture from the heterogeneous mixture without mechanical mixing is not required. Nevertheless, without being bound by theory, it is believed that the applying acoustic energy at the frequency of from 20 to 100 Hz generates sound waves that cause the (A) polyolefin solids and the (B) carbon solids to oscillate rapidly. They experience a relatively large physical displacement, the magnitude and rapidity of which are believed to be a function of the frequency and acoustic intensity. This oscillating of the (A) polyolefin solids and the (B) carbon solids results in their rapid intermixing to form the homogeneous mixture. The homogeneous mixture is thus made without melting the (A) polyolefin solids, and, optionally, without any mechanical mixing of (A) polyolefin solids and the (B) carbon solids. Thus, the present method is distinct from prior mixing methods, which rely on mechanical blending of solids (e.g., in a stirred tank device) or melts (e.g., in a twin-screw extruder device) of polyolefins with (B) carbon solids.

Sound having a frequency less than 20 Hertz (Hz) is called "infrasound"; and from 20 Hz to 20 kilohertz (KHz), "acoustic"; and greater than 20 KHz (up to 200 megahertz (MHz) or higher), "ultrasound". Without being bound by theory it is believed that infrasound and ultrasound and acoustic sound above 100 Hz cannot, by itself, rapidly oscillate the (A) polyolefin solids or the (B) carbon solids in the heterogeneous mixture in a way that would create the relatively large physical displacement thereof and thereby yield the homogeneous mixture. The applying acoustic energy at a frequency of from 20 to 100 Hz is called "acoustic mixing" herein.

To apply the effective acoustic energy by practical means, the method may make the homogeneous mixture in an acoustic mixer device. Such a device may be free of components that could interfere with or dampen the acoustic energy of the applying acoustic energy step. Acoustic mixer devices for various scale uses from lab bench to commercial manufacturing may be available commercially, including resonant acoustic mixers from Resodyn Acoustic Mixers, Butte, Montana, USA.

The method may further comprise a limitation without mechanically agitating (moving by mechanical means) the heterogeneous mixture during the applying acoustic energy step. Mechanically moving means putting in motion manually or via a machine via a direct contact force wherein a physical object (e.g., a stirrer paddle, a screw, a plunger, or a blender) touches and thereby moves a material. Examples of mechanically moving are stirring, screw mixing, plunger mixing, blender mixing, and other direct physically contacting. The contact force does not include electromagnetic force, gravity, acoustic force, and convective force.

In addition to the applying acoustic energy step, some embodiments of the method may further comprise one or more optional steps. Typically, the optional step does not occur at the same time as the applying acoustic energy step. An optional step may occur before the applying acoustic energy step, or after the acoustic energy step, as described herein.

The method may further comprise, after the applying acoustic energy step, a subsequent step of melting and shaping the homogeneous mixture made by the applying acoustic energy step, and cooling the shaped homogeneous mixture so as to make a manufactured article comprising the shaped homogeneous mixture.

The method may further comprise, after the applying acoustic energy step, the step of melting the (A) polyolefin solids of the homogeneous mixture to make a homogeneous melt mixture comprising the (B) carbon solids, one or more additives, if present, and a melt of the (A) polyolefin solids; shaping the homogeneous melt mixture to give a shaped melt mixture; and cooling the shaped melt mixture to give a shaped solid. The melting and shaping may be free of mechanical agitating, alternatively may employ mechanical agitating. The shaping may comprise coating, extruding, molding, pelletizing, or extruding and pelletizing. In some embodiments the shaping comprises extruding the homogeneous melt mixture, and pelletizing the extrudate to make pellets of the homogeneous mixture. The shaped solid may be useful as manufactured article. The manufactured article may be a coating layer of a coated conductor such as a telecommunications or power cable.

The method may further comprise the optional step of curing (crosslinking) the coating-shaped solid so as to give a coated conductor comprising the conductive core and a coating-shaped cured product at least partially covering the conductive core. This aspect may be used to make a manufactured article comprising a power cable such as a low voltage power cable.

The method may further comprise, before the applying acoustic energy step, an optional step of making the heterogeneous mixture. The heterogeneous mixture may be made by contacting the (A) polyolefin solids with the (B) carbon solids, and, optionally, one or more additives, so as to make the heterogeneous mixture comprising the constituents (A) and (B) and, if present, the one or more additives. The contacting step is performed in the absence of acoustic energy and, ideally, without melting the (A) polyolefin solids.

The contacting of constituents (A) and (B) and, optionally, the one or more additives to make the heterogeneous mixture may be done simultaneously (all at once) or sequentially, or a combination of some all at once and the rest sequentially (stepwise). The simultaneous contacting may comprise combining the constituents (A), (B), and any one or more additives together at the same time in a container to make the heterogeneous mixture.

The stepwise contacting may comprise different embodiments. In some embodiments the sequential contacting may comprise contacting the (B) carbon solids with at least one of the one or more additives to give a first precontacted batch that is free of (A), and then contacting the (A) polyolefin solids with the first precontacted batch to make the embodiment of the heterogeneous mixture comprising (A), (B), and the one or more additives.

Alternatively, the sequential contacting may comprise contacting the (A) polyolefin solids with at least one of the one or more additives to give a second precontacted batch that is free of (B), and then contacting the (B) carbon solids with the second precontacted batch to make the embodiment of the heterogeneous mixture of (A), (B), and the one or more additives.

Alternatively, a combination of the two forgoing sequential embodiments may be performed using a first additive to make the first precontacted batch and a second additive to make the second precontacted batch, wherein the first and second additives are same or different, and then contacting the first and second precontacted batches together to make the embodiment of the heterogeneous mixture comprising (A), (B), and the one or more additives.

Prior to the contacting step, the (A) polyolefin solids used to make the embodiment of the heterogeneous mixture may be free of the (B) carbon solids, and vice versa the (B) carbon solids used may be free of the (A) polyolefin solids. Alternatively in some embodiments a masterbatch comprising a higher than final loading of the (B) carbon solids dispersed in a portion of the (A) polyolefin solids may be premade, and then the masterbatch may be contacted with the remaining portion of the (A) polyolefin solids to make the heterogeneous mixture. The same or a different masterbatch may be comprise the one or more additives, which may be contacted with a remaining portion of the (A) polyolefin solids and the (B) carbon solids to make that embodiment of the heterogeneous mixture. The masterbatch may be made by acoustic mixing or conventional melt-mixing.

The (A) polyolefin solids used in the contacting step, for making the heterogeneous mixture, may be free of the one or more additives (e.g., the (A) polyolefin solids may consist of granules or pellets of virgin polyolefin resin).

Alternatively, the (A) polyolefin solids used in the contacting step, for making the heterogeneous mixture, may contain some or all of the one or more additives such as one or more antioxidants and heat stabilizers. These additives may have been premixed into granules or pellets of virgin polyolefin resin via melt mixing or melt compounding the virgin resin so as to make the (A) polyolefin solids containing one or more antioxidants and heat stabilizers.

The heterogeneous mixture may be made by contacting neat (A) polyolefin solids that are free of the particulate solid additive with the particulate solid additive without homogenizing same. Alternatively, may be made by contacting a homogeneous mixture, made by inventive acoustic mixing or comparative melt-mixing, with a second particulate solid additive and/or a liquid additive without homogenizing same. Alternatively, may be made by dehomogenizing a homogeneous mixture of the (A) polyolefin solids and particulate solid additive such as by allowing the homogeneous mixture to stand at 25° C. for a period of time sufficient to result in migration of the particulate solid additive to surfaces of the (A) polyolefin solids.

The heterogeneous mixture may have never before been homogenized or may have been dehomogenized as described above. Either way, the heterogeneous mixture is a non-uniform, physical combination of matter, e.g., consisting of unblended or partially (incompletely) blended constituents. The homogenization of the dehomogenized mixture may reconstitute its predecessor homogeneous mixture without remelting the polyolefin.

The heterogeneous mixture used in the step of applying acoustic energy may be freshly prepared by such contacting step. The "freshly prepared" means that the time between the contacting step and start of the applying acoustic energy step may be less than 30 minutes, alternatively less than 15 minutes, alternatively less than 10 minutes, alternatively less than 5 minutes. Alternatively, the heterogeneous mixture used in the step of applying acoustic energy may be pre-aged. The "pre-aged" means that the time between the contacting step and start of the applying acoustic energy step may be at least 30 minutes, alternatively greater than 60 minutes, alternatively greater than 120 minutes.

The homogeneous mixture is made by the applying acoustic energy step of the method. The homogeneous mixture may be characterized as such as described earlier. Without being bound by theory, the product of that step may be characterized as homogeneous in that the (B) carbon solids are substantially uniformly adsorbed on exterior surfaces, and any accessible interior surfaces, of the (A) polyolefin solids. The "substantially uniformly adsorbed" means virtually all accessible surfaces of the (A) polyolefin solids have at least some (B) carbon solids adsorbed thereon, although the amounts of adsorbed (B) carbon solids may vary across the surfaces. Once adsorbed on surfaces of the (A) polyolefin solids, the (B) carbon solids may remain thereon until, in an optional subsequent step, the (A) polyolefin solids are melted.

When the heterogeneous mixture, and the homogeneous mixture made therefrom, includes the one or more additives, the (A) polyolefin solids may be from 50 to 99.8 weight percent (wt %), the (B) carbon solids may be from 0.1 to 5.0 wt %, and the total weight of the one or more additives may be from 0.1 to 45 wt %, all based on the weight of the homogeneous mixture and homogeneous mixture, respectively; and wherein the total weight of all the constituents of the heterogeneous mixture is 100.0 wt % and the total weight of all constituents of the homogeneous mixture is 100.0 wt %.

Without being bound by theory, it is believed that the total weight of the homogeneous mixture is equal to the total weight of the heterogeneous mixture from which it is made. That is, it is believed that the applying acoustic energy step does not result in any significant loss or gain of weight going from the heterogenous mixture to the homogeneous mixture.

The (A) polyolefin solids. A finely-divided, solid-state matter composed of polyolefin macromolecules that independently comprise at least 5, alternatively from 10 to 200,000 constituent units derived from polymerizing one or more olefin-functional monomers.

The polyolefin may be a homopolymer or a copolymer. The homopolymer is made by polymerizing only one olefin monomer. The copolymer is made by polymerizing at least two different olefin monomers. The copolymer may be a bipolymer made by polymerizing two different olefin monomers, a terpolymer made by polymerizing three different olefin monomers, or a tetrapolymer made by polymerizing four different olefin monomers. The polyolefin that is a copolymer may be a block copolymer or a random copolymer.

Examples of the olefin-functional monomers used to make the polyolefin(s) of the (A) polyolefin solids are ethylene, propene, ($C_4$-$C_{20}$)alpha-olefins, cyclic alkenes (e.g., norbornene), dienes (e.g., 1,3-butadiene), unsaturated carboxylic esters, and olefin-functional hydrolyzable silanes. Examples of the ($C_4$-$C_{20}$)alpha-olefin are a ($C_4$-$C_8$) alpha-olefin such as 1-butene, 1-hexene, or 1-octene; and a ($C_{10}$-$C_{20}$)alpha-olefin. Example of the diene is 1,3-butadiene. Examples of the unsaturated carboxylic esters are alkyl acrylates, alkyl methacrylates, and vinyl carboxylates (e.g., vinyl acetate). Examples of the olefin-functional hydrolyzable silanes are vinyltrialkoxysilanes, vinyltris(dialkylamino)silanes, and vinyl(trioximo)silanes.

Examples of such polyolefins are a polyethylene homopolymer; an ethylene/alpha-olefin copolymer; a (hydrolyzable silyl group)-functional polyethylene copolymer (HSG-FP Copolymer); an ethylene/unsaturated carboxylic ester copolymer (e.g., ethylene/vinyl acetate (EVA) copolymer or ethylene/alkyl (meth)acrylate (EAA or EAM) copolymer); a halogenated polyolefin (e.g., a chlorinated polyolefin such as a poly(vinyl chloride) polymer, and a combination of any two or more thereof.

In some embodiments the polyolefin of the (A) polyolefin solids is an ethylene-based polymer. An ethylene-based polymer comprises from 51 to 100 wt % of ethylenic units derived from polymerizing ethylene and from 49 to 0 wt % of comonomeric units derived from polymerizing one, alternatively two olefin-functional monomer (comonomer). The comonomer may be selected from propylene, a ($C_4$-$C_{20}$) alpha-olefin, and 1,3-butadiene. The ($C_4$-$C_{20}$)alpha-olefin may be a ($C_4$-$C_8$)alpha-olefin such as 1-butene, 1-hexene, or 1-octene.

Examples of suitable ethylene-based polymers are polyethylene homopolymers, ethylene/($C_4$-$C_{20}$)alpha-olefin copolymers, ethylene/propylene copolymers, ethylene/propylene/diene monomer (EPDM) copolymers such as an ethylene/propylene/1,3-butadiene terpolymer, and ethylene/1-butene/styrene copolymers. Examples of suitable ethylene/($C_4$-$C_{20}$)alpha-olefin copolymers are ethylene/1-butene copolymers, ethylene/1-hexene copolymers, and ethylene/1-octene copolymers. The ethylene-based polymers may be an ultra-low-density polyethylene (ULDPE), very low-density polyethylene (VLDPE), a linear low-density polyethylene (LLDPE), a low-density polyethylene (LDPE), a medium-density polyethylene (MDPE), a high-density polyethylene (HDPE), or an ultra-high-density polyethylene (UHDPE). Many of the ethylene-based polymers are sold by The Dow Chemical Company under trade names like AFFINITY, ATTANE, DOWLEX, ENGAGE, FLEXOMER, or INFUSE. Other ethylene-based polymers are sold by other suppliers under trade names like TAFMER, EXCEED, and EXACT.

In some embodiments the (A) polyolefin solids consist of solids of only one ethylene-based polymer (e.g., only LLDPE, or only LDPE, or only MDPE, or only HDPE).

In other embodiments the (A) polyolefin solids comprise two or more different ethylene-based polymers. In some such embodiments the (A) polyolefin solids comprises a particle blend of first solids of a first linear low-density polyethylene (first LLDPE) and at least one of second solids of a medium-density polyethylene (MDPE) and third solids of a second LLDPE that is different than the first LLDPE. In some embodiments the particle blend comprises the first LLDPE and the MDPE; alternatively the first LLDPE and the second LLDPE; alternatively each of the first LLDPE, the MDPE, and the second LLDPE.

In some embodiments the ethylene-based polymer that is free of halogen and silicon atoms is a polyethylene homopolymer, a poly(ethylene-co-1-butene) copolymer, a poly(ethylene-co-1-hexene) copolymer, a poly(ethylene-co-1-octene) copolymer, or a combination of any two or more thereof. In some such embodiments the polyolefin is a low-density polyethylene (LDPE), a linear low-density polyethylene (LLDPE), a medium-density polyethylene (MDPE), a high-density polyethylene (HDPE), or a combination of any two or more thereof (e.g., a combination of one LLDPE and one MDPE or a combination of two LLDPE and one MDPE).

In some embodiments the ethylene-based polymer is at least one of (i) to (x): (i) a first linear low-density polyethylene (first LLDPE) having a density of from 0.915 to 0.924 g/cc and a melt index ($I_2$, 190° C., 2.16 kg) of 0.5 to 1.0 g/10 min. (e.g., the LLDPE-1 described later for Polyolefin Solids (A)-1 in the EXAMPLES); (ii) a medium-density polyethylene (MDPE) having a density of 0.930 to 0.940 g/cc and a melt index ($I_2$, 190° C., 2.16 kg) of 0.5 to 1.0 g/10 min. (e.g., the MDPE-1 described later for Polyolefin Solids (A)-2 in the EXAMPLES); (iii) a second LLDPE having a density of 0.920 to 0.927 g/cc and a melt index ($I_2$, 190° C., 2.16 kg) of 15 to 24 g/10 min. (e.g., the LLDPE-2 described later for Polyolefin solids (A)-3 in the EXAMPLES); (iv) a first low-density poly(ethylene-co-1-hexene) copolymer (first LDPE) having a density of from 0.915 to 0.924 g/cc and a melt index ($I_2$, 190° C., 2.16 kg) of 0.5 to 1.0 g/10 min. (e.g., the LDPE-1 described later for Polyolefin Solids (A)-4 in the EXAMPLES); (v) a second low-density poly(ethylene-co-1-hexene) copolymer (second LDPE) having a density of 0.920 to 0.927 g/cc and a melt index ($I_2$, 190° C., 2.16 kg) of 15 to 24 g/10 min. (e.g., the LDPE-2 described later for Polyolefin solids (A)-5 in the EXAMPLES); (vi) both (i) and (iii); (vii) each of (i) to (iii); (viii) both (i) and (v); (ix) both (ii) and (iv); and (x) both (iv) and (v).

The (A) polyolefin solids may consist essentially of only one polyolefin.

In some embodiments the (A) polyolefin solids consist essentially of two or three different polyolefins. Such embodiments of the (A) polyolefin solids may consist essentially of solids wherein each particle of the solids comprises a polymer blend of the two or more different polyolefins. Other such embodiments may comprise a particle blend of first solids consisting essentially of a first polyolefin only, second solids consisting essentially of a second polyolefin only, and, optionally, third solids consisting essentially of a third polyolefin only; wherein the first and second polyolefins, and, if present, the third polyolefin, are different than each other. Still other embodiments may comprise a particle blend of first solids consisting essentially of a first polyolefin only and second solids consisting essentially of a polymer blend of a second polyolefin and a third polyolefin; wherein the first and second polyolefins are different than each other and the first and third polyolefins are the same or different.

In some embodiments the polyolefin of the (A) polyolefin solids is free of halogen and/or silicon atoms. In some embodiments the polyolefin is also free of oxygen atoms and/or nitrogen atoms. In some embodiments the ethylene-based polymer is free of halogen and/or silicon atoms. In some embodiments the ethylene-based polymer is also free of oxygen atoms and/or nitrogen atoms. In other embodiments the ethylene-based polymer is free of halogen and/or silicon atoms and free of oxygen and nitrogen atoms derived from an oxygen-containing and/or nitrogen-containing olefin monomer, but contains crosslinks containing oxygen and/or nitrogen atoms derived from oxygen and/or nitrogen-containing crosslinking coagents (e.g., triallyl isocyanurate or 2,4,6-tris(diallylamino)-1,3,5-triazine).

In some embodiments the polyolefin of the (A) polyolefin solids is a propylene-based polymer comprising from 51 to 100 wt % of propylenic units derived from polymerizing propylene and from 49 to 0 wt % of comonomeric units derived from polymerizing one, alternatively two olefin-functional monomer (comonomer) selected from ethylene; a ($C_4$-$C_8$)alpha-olefin such as 1-butene, 1-hexene, or 1-octene.

The (A) polyolefin solids may be porous or non-porous. The (A) polyolefin solids may comprise a powder, granules, or pellets.

The (A) polyolefin solids may have a melting temperature at which melting begins or starts that is 60° C. or greater, alternatively greater than 100° C., alternatively greater than 110° C. The (A) polyolefin solids may have a melting temperature at which melting ends or completes of at most 220° C., alternatively at most 180° C., alternatively at most 150° C.

The (A) polyolefin solids of the heterogeneous mixture may be characterized by an average particle size of from 10 to 500 particles per gram (ppg), alternatively from 11 to 80 ppg, alternatively from 20 to 40 ppg, as measured by counting.

The (B) carbon solids. A plurality of particulates having a state of matter that is stable in volume and shape (i.e., not a gas or liquid) and consisting essentially of carbon atoms arranged in a crystalline, paracrystalline, or amorphous structure, or a combination of any two or more structures thereof.

The crystalline (B) carbon solids may be a powder or granules of any one of the following: diamond; graphite, including expanded graphite platelets and graphene; fullerenes; or a blend of any two or more crystalline forms thereof.

The amorphous carbon solids may be a powder derived from coal, soot, carbide, or a blend of any two or more sources thereof.

The paracrystalline carbon solids may be a carbon black. The carbon black may be acetylene black, channel black, furnace black, lamp black, thermal black, or a blend of any two or more thereof.

In some embodiments the (B) carbon solids are a carbon black. Carbon black is a finely-divided form of paracrystalline carbon having a high surface area-to-volume ratio, but lower than that of activated carbon.

The embodiments of the homogeneous mixture that comprise the (A) polyolefin solids and (B) carbon solids that are carbon black may be used as a jacketing composition in a telecommunications cable. The carbon black beneficially provides good outdoor weatherability for the jacketing compounds. Here good outdoor weatherability particularly includes stabilized against degrading effects of ultraviolet (UV) light. The weatherability may be tested using three cable samples in accordance with the appropriate procedures of either ASTM D 822-89 or ASTM G 23-90. Total exposure time shall be a minimum of 800 hours. Failure is defined as fading, cracking, blistering, or delaminating on any of the three test cables.

The carbon black suitable for use herein, including for the embodiments of the homogeneous mixture useful as jacketing compositions, may have a surface area of about 20 to about 1500 square meters per gram (m²/g). The surface area is determined under ASTM D 4820-93a (Multipoint B.E.T. Nitrogen Adsorption). In some embodiments the carbon black has an average particle size of less than or equal to 20 nanometers (nm), e.g., an average particle size from 10 to 20 nm. In some embodiments the homogeneous mixture made by the method has a carbon black content of from 2.3 to 2.9 wt %, alternatively 2.6±0.25 wt %, alternatively from 2.5 to 2.7 wt %, alternatively from 2.55 to 2.64 wt %. These embodiments meet an industry standard for telecommunication cables.

Examples of suitable carbon blacks are furnace black, acetylene black, and Ketjen black. The carbon black may be a furnace carbon black, alternatively a furnace carbon black that is CABOT CSX-362 from Cabot Corporation.

The gross shape of the (B) carbon solids may be spherical, irregular particles, fibers, tubes, plates, or a blend of any two or more shapes thereof.

The melting temperature of the (B) carbon solids is expected to be more than 1,000 degrees Celsius (° C.) higher than the melting temperature of the (A) polyolefin solids. The (B) carbon solids may have a melting temperature at which melting begins or starts that is greater than 2,000.0° C., alternatively greater than 3,000° C., alternatively greater than 3,400° C. The (B) carbon solids may have a melting temperature at which melting ends or completes of at most 4,500° C., alternatively at most 4,000° C., alternatively at most 3,900° C. Thus maintaining the temperature of the (A) polyolefin solids, the heterogeneous mixture containing same, and the homogeneous mixture made therefrom, below the melting temperature of the (A) polyolefin solids is also effective for maintaining the temperature far below the melting point of the (B) carbon solids.

The (B) carbon solids may be electrically conductive, electrically semiconductive, or electrically non-conductive. The (B) carbon solids may be an electrically conductive carbon black. Embodiments of the homogeneous mixture comprising the (A) polyolefin solids and the (B) carbon solids wherein the carbon solids are an electrically conductive carbon black are useful for making semiconductive layers of a coated conductor containing such a layer, such as a coated conductor that is a power cable for transmitting medium voltage (MV), high voltage (HV), or extra-high voltage (EHV) electrical currents.

The (B) carbon solids may be provided in a masterbatch formulation of a poly(1-alkene-co-ethylene) copolymer (from 50 wt % to 90 wt % of the total weight of the masterbatch) and (B) carbon solids (from 50 wt % to 10 wt % of the total weight of the masterbatch.

The optional one or more additives. A substance that is not the (A) polyolefin solids or the (B) carbon solids and is added to the heterogeneous mixture to improve one or more properties of the homogeneous mixture made therefrom. Without being bound by theory, it is believed that the applying acoustic energy step of the method does not decompose any additive such than if the heterogeneous mixture contains an additive, that additive will also be contained in the homogeneous mixture made from that heterogeneous mixture.

In some embodiments the heterogeneous mixture, and the homogeneous mixture made therefrom, is free of additives. In other embodiments the heterogeneous mixture, and the homogeneous mixture made therefrom contains 1 or more additives.

The homogeneous mixture may further comprise one or more additional additives that is/are not present in the heterogeneous mixture from which it was made, but are added to the homogeneous mixture after the applying acoustic energy step. The method of adding such additional additives may comprise melting the (A) polyolefin solids as in a melt mixing or melt compounding operation. Alternatively, the method of adding such additional additives may comprise a melting-free operation such as passively soaking or imbibing such additional additives into the homogeneous mixture at a temperature of from 20° to 90° C. (e.g., 50° to 80° C.). Liquid additives and particulate solid additives having a melting point less than 90° C. are useful for such soaking or imbibing methods.

In some embodiments the heterogeneous mixture, and the homogeneous mixture made therefrom contains 1 or more additives, alternatively 2 or more additives, alternatively 3 or more additives, alternatively 4 or more additives, alternatively 5 or more additives. In some embodiments the heterogeneous mixture, and the homogeneous mixture made therefrom contains a total of 10 or fewer additives, alternatively a total of 9 or fewer additives, alternatively a total of 8 or fewer additives, alternatively a total of 7 or fewer additives, alternatively a total of 6 or fewer additives.

In some embodiments at least one, alternatively all but one, alternatively each of the one or more additives that is not constituents (A) or (B) is independently a liquid or particulate solid additive selected from additives (C) to (I): a liquid or particulate solid (C) antioxidant; a liquid or particulate solid (D) colorant; a liquid or particulate solid (E) scorch retardant; a liquid or particulate solid (F) stabilizer for stabilizing the homogeneous mixture against effects of ultraviolet light and/or heat; a liquid or particulate solid (G) processing aid; a liquid or particulate solid (H) flame retardant; and (I) a solid filler. Each additive independently may be a liquid additive or a particulate solid additive. In some embodiments the heterogeneous mixture, and the homogeneous mixture from which it was made, contains at least one particulate solid additive, alternatively at least one liquid additive, alternatively at least one particulate solid additive and at least one liquid additive.

The optional particulate solid additive. Substance that is not or does not contain a polyolefin polymer, i.e., is not any type of polymer or is a polymer wherein the constituent units are not derived from an olefin-functional monomer. The heterogeneous mixture and homogeneous mixture may comprise zero particulate solid additive, alternatively one particulate solid additive, alternatively a combination of two or more particulate solid additives. The particulate solid additive may be inorganic or organic.

Each of the at least one particulate solid additive may have a melting temperature at which melting begins or starts that is greater than 20.0° C., alternatively greater than 100° C., alternatively greater than 200° C. The at least one particulate solid additive may have a melting temperature at which melting ends or completes of at most 4,000° C., alternatively at most 2,000° C., alternatively at most 1,000° C. Each particulate solid additive independently may be characterized by a melting point from 40° to 999° C.

Each particulate solid additive independently may have a melting point that is lower than, the same as, or higher than the melting temperature of the (A) polyolefin solids.

In some embodiments at least one particulate solid additive independently may be characterized by a glass transition temperature, if any, and/or by a melting temperature greater than the melting temperature of the (A) polyolefin solids, e.g., a melting temperature greater than 140° C., alternatively greater than 180° C. The actual glass transition temperature, if any, and melting temperature of the particulate solid additive is not important as long as it is/they are high enough that the particulate solid additive does not glass transition or melt during the applying acoustic energy step.

In some embodiments the at least one particulate solid additive has a melting point that is higher than the melting temperature of the (A) polyolefin solids, and during the applying acoustic energy step the temperature of the heterogeneous mixture (and, for that matter, the homogeneous mixture made therefrom) is maintained below the melting point of such higher-melting particulate solid additive and below the melting temperature of the (A) polyolefin solids such that the applying acoustic energy step makes the homogeneous mixture without melting the (A) polyolefin solids and without melting the higher-melting particulate solid additive. In other embodiments the at least one particulate solid additive has a melting point that is lower than the melting temperature of the (A) polyolefin solids, and during the applying acoustic energy step the temperature of the heterogeneous mixture (and, for that matter, the homogeneous mixture made therefrom) is maintained below the melting point of such lower-melting particulate solid additive such that the applying acoustic energy step makes the homogeneous mixture without melting the (A) polyolefin solids and without melting the lower-melting particulate solid additive. In other embodiments the at least one particulate solid additive has a melting point that is lower than the melting temperature of the (A) polyolefin solids, and during the applying acoustic energy step the temperature of the heterogeneous mixture (and, for that matter, the homogeneous mixture made therefrom) is maintained above the melting point of such lower-melting particulate solid additive but below the melting temperature of the (A) polyolefin solids such that the applying acoustic energy step makes the homogeneous mixture without melting the (A) polyolefin solids but with melting the lower-melting particulate solid additive.

In some embodiments the heterogeneous mixture, and thus the homogeneous mixture made therefrom, contains at least one, alternatively at least two, alternatively all but one, alternatively each of the following additives: a solid heat stabilizer that is a poly(1,2-dihydro-2,2,4-trimethylquinoline) solid having an average molecular weight of 874 g/mol and a softening temperature of 128° C. (CAS No. 26780-96-1; e.g., Naugard Super Q); a polymer processing additive (PPA) that is a solid fluorinated polyolefin polymer provided as a granular solid and having a melting temperature from 110° to 126° C.; a melt flow index (265° C., 5.0 kg) from 15.0 to 25.0 g/10 min.; a particle size 98% less than 2,400 µm; and typical use level from 200 to 1,000 weight parts per million (ppmw) based on amount of polyolefin (e.g., 3M Dynamar FX-5912 from 3M Corporation); a solid antioxidant that is 3,5-bis(1,1-dimethylethyl)-4-hydroxybenzenepropanoic acid 2,2'-thiodiethanediyl ester having a melting point of 78° C. (e.g., IRGANOX 1035, CAS Number 41484-35-9); and a solid antioxidant that is 4,4'-thiobis(2-t-butyl-5-methylphenol) having a melting point of from 160° to 163° C. (also known as 4,4'-thiobis(6-tert-butyl-m-cresol), CAS No. 96-69-5, commercially LOWINOX TBM-6).

Other examples of the particulate solid additives are powdered metals, powdered metal oxides, solid flame retardants, silica, alumina, and silicate glass beads.

The optional liquid additive. A neat liquid or a solution of a liquid or a solid additive (solute) dissolved in a liquid solvent. The neat liquid is composed of molecules that are not polyolefin polymer macromolecules and have a temperature characteristic (i) or (ii): (i) a freezing point of less than 0° C., alternatively from 0° to 20.0° C.; or (ii) a melting point from 20.1° to 99° C., alternatively from 30.0° to 79.9° C., alternatively from 40.0° to 69.9° C. The liquid additive solute in the solution may be the same compound as described for the neat liquid. The solid additive solute in the solution may be a compound having a solubility of at least 1 wt % in the liquid solvent. The liquid solvent may be an organic liquid chosen for having a boiling point above the temperature of the heterogeneous mixture during the applying acoustic energy step. Suitable liquid solvents are hydrocarbons (e.g., mineral oil or xylenes), ethers (e.g., dibutyl ether), and blends of two or more thereof.

In some aspects the liquid additive is added to the (A) polyolefin solids as a neat liquid and the heterogeneous mixture is free of any liquid solvent. In some aspects the heterogeneous mixture, the method of making, and the homogeneous mixture made thereby is free of a liquid additive.

The liquid additive may or may not impart to the homogeneous mixture and/or to the (A) polyolefin solids thereof at least one beneficial functional property. For example, the liquid additive may merely be a filler material used only to lower the cost of a product made from the homogeneous mixture relative to the cost of a product made from the (A) polyolefin solids without the liquid additive, but without providing a functional benefit thereto. Alternatively, the liquid additive may impart to the homogeneous mixture and/or to the (A) polyolefin solids thereof at least one functional property such as color, increased stability (e.g., to degrading, embrittling, sagging, or dielectric losing effects from exposure to heat, ultraviolet light, electricity, and/or water), a source of crosslinking (when the liquid additive is a crosslinking coagent or a catalyst for enhancing crosslinking of the polyolefin), increased conductivity (e.g., electrical and/or thermal conductivity), and increased modulus.

Examples of the at least one particulate solid additive are the particulate solid additives $(C)_{sol}$ to $(I)_{sol}$ described earlier and examples of the at least one liquid additive are the liquid additives $(C)_{liq}$ to $(H)_{liq}$ described earlier. These additives are generally described below. Using the above description of particulate solid additives and liquid additives and the definitions of solid and liquid given later, it would be trivial for a person of ordinary skill in the art to determine which of the particular additives described below are particulate solid additives and which are liquid additives.

Optional liquid or particulate solid additive (C) antioxidant: an organic molecule that inhibits oxidation, or a collection of such molecules. The (C) antioxidant is different in composition than the (F) stabilizer, which means when the heterogeneous or homogeneous mixture contains both (C) and (F), the compound used as (C) is different than that used as (F). The (C) antioxidant functions to provide antioxidizing properties to the heterogeneous or homogeneous mixture and/or a cured polymer product made by curing the homogeneous mixture. Examples of suitable (C) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4; 4,4'-thiobis(2-t-butyl-5-methylphenol) (also known as 4,4'-thiobis(6-tert-butyl-m-cresol), CAS No. 96-69-5, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); distearyl thiodipropionate ("DSTDP"); dilauryl thiodipropionate (e.g., IRGANOX PS 800): stearyl 3-(3,5-di-t-butyl-4-hydroxyphenyl)propionate (e.g., IRGANOX 1076); 2,4-bis (dodecylthiomethyl)-6-methylphenol (IRGANOX 1726); 4,6-bis(octylthiomethyl)-o-cresol (e.g. IRGANOX 1520); and 2',3-bis[[3-[3,5-di-tert-butyl-4-hydroxyphenyl]propionyl]] propionohydrazide (IRGANOX 1024). The (C) may be 4,4'-thiobis(2-t-butyl-5-methylphenol) (also known as 4,4'-thiobis(6-tert-butyl-m-cresol); 2,2'-thiobis(6-t-butyl-4-methylphenol; tris[(4-tert-butyl-3-hydroxy-2,6-dimethylphenyl)methyl]-1,3,5-triazine-2,4,6-trione; distearyl thiodipropionate; or dilauryl thiodipropionate; or a combination of any two or more thereof. The combination may be tris[(4-tert-butyl-3-hydroxy-2,6-dimethylphenyl)methyl]-1,3,5-triazine-2,4,6-trione and distearyl thiodipropionate. The heterogeneous and/or homogeneous mixture may be free of (C). When present, the (C) antioxidant may be from 0.01 to 1.5 wt %, alternatively 0.1 to 1.0 wt % of the total weight of the heterogeneous and/or homogeneous mixture.

Optional liquid or particulate solid additive (D) a colorant that is not (B) carbon solids. E.g., a pigment or dye. E.g., titanium dioxide. The heterogeneous and/or homogeneous mixture may be free of (D). When present (D) may be from 0.1 to 35 wt %, alternatively 1 to 10 wt % of the heterogeneous and/or homogeneous mixture.

Optional liquid or particulate solid additive (E) scorch retardant. The (E) scorch retardant functions to inhibit premature moisture curing of the moisture-curable embodiments of the heterogeneous and/or homogeneous mixture, wherein premature moisture curing would result from premature or prolonged exposure of the mixture to ambient air or when the mixture is at ambient temperature or elevated temperature (e.g., during later melt extrusion). Examples of (E) are octyltriethoxysilane and octyltrimethoxysilane and vinyltrimethoxysilane. The heterogeneous and/or homogeneous mixture may be free of (E). When present (E) may be from 0.001 to 5.0 wt %, alternatively 0.01 to 3.0 wt %, alternatively 0.10 to 1.5 wt %, alternatively 0.15 to 1.0 wt % of the heterogeneous and/or homogeneous mixture.

Optional liquid or particulate solid additive (F) a stabilizer for stabilizing the heterogeneous and/or homogeneous mixture against ultraviolet light (UV stabilizer). The (F) stabilizer is different in composition than the (C) antioxidant, which means when the mixture contains both (C) and (F), the compound used as (C) is different than that used as (F). Examples are a hindered amine light stabilizer (HALS), a benzophenone, or a benzotriazole. The (F) UV stabilizer may be a molecule that contains a basic nitrogen atom that is bonded to at least one sterically bulky organo group and functions as an inhibitor of degradation or decomposition, or a collection of such molecules. The HALS is a compound that has a sterically hindered amino functional group and inhibits oxidative degradation and can also increase the shelf lives of embodiments of the mixture that contain organic peroxide. Examples of suitable (F) are butanedioic acid dimethyl ester, polymer with 4-hydroxy-2,2,6,6-tetramethyl-1-piperidine-ethanol (CAS No. 65447-77-0, commercially LOWILITE 62); and N,N'-bisformyl-N,N'-bis(2,2,6,6-tetramethyl-4-piperidinyl)-hexamethylenediamine (CAS No. 124172-53-8, commercially Uvinul 4050 H). The heterogeneous and/or homogeneous mixture may be free of (F). When present, the (F) UV stabilizer may be from 0.001 to 1.5 wt %, alternatively 0.002 to 1.0 wt %, alternatively 0.05 to 0.1 wt % of the heterogeneous and/or homogeneous mixture.

Optional liquid or particulate solid additive (G) processing aid: a molecule that decrease adherence of polymer melts in manufacturing equipment such as extruders and dies and to decrease melt fracture of materials in embodiments where the homogeneous mixture is used later therein. The (G) may be fluoropolymers, polyorganosiloxanes, metal salts of fatty carboxylic acids, fatty carboxamides, waxes, ethylene oxide (co)polymers, and non-ionic surfactants. The heterogeneous and/or homogeneous mixture may be free of (G). When present, the (G) processing aid may be from 0.05 to 5 wt % of the heterogeneous and/or homogeneous mixture.

A bit more is said here about the optional liquid additive $(G)_{liq}$ liquid processing aid. To improve the mixing of the (B) carbon solids into and onto the surfaces of the (A) polyolefin solids, embodiments of the applying acoustic energy step may use a small but effective amount of the $(G)_{liq}$ liquid processing aid. The $(G)_{liq}$ may be a mineral oil or a silicone oil (i.e., a PDMS fluid). Without being bound by theory, it is believed that the $(G)_{liq}$ liquid processing aid improves acoustic mixing by adhering or sticking to either the (A) polyolefin solids and/or to the (B) carbon solids, thereby making it easier for the particles of (A) and (B) to intermix with each other. The effective amount of the $(G)_{liq}$ liquid processing aid may be so small that later, after the homogeneous mixture is made, the $(G)_{liq}$ therein would not affect melt viscosity of the same such as during a later melt extrusion step for making the shaped article. The amount of the $(G)_{liq}$ liquid processing aid may be from 0.1 to 1.0 wt %, alternatively from 0.2 to 0.8 wt %, alternatively from 0.3 to 0.7 wt % (e.g., about 0.5 wt %) of the total weight of the heterogeneous mixture, and the homogeneous mixture from which it is made. The $(G)_{liq}$ liquid processing aid may be added to the heterogeneous mixture before starting the applying acoustic energy step.

Optional liquid or particulate solid additive (H) flame retardant. The (H) flame retardant is a compound that inhibits or delays the spread of fire by suppressing chemical reactions in a flame. The (H) flame retardant may be (H1) a mineral, (H2) an organohalogen compound, (H3) an (organo)phosphorus compound; (H4) a halogenated silicone; (H5) a combination of any two or more of (H1) to (H4); (H6) a combination of any one of (H1) to (H4) and a flame-retardant synergist (e.g., antimony trioxide). The heterogeneous and/or homogeneous mixture may be free of (H). When present, the (H) flame retardant may be from 0.1 to 80.0 wt %, alternatively 1 to 50.0 wt %; and alternatively 5 to 30.0 wt % of the heterogeneous and/or homogeneous mixture.

Optional particulate solid additive (I) filler. The filler may be a particulate inorganic solid such as alumina or silica. In some embodiments the (I) filler is a hydrophobic agent-treated fumed silica such as a fumed silica that has been surface treated with a silicon-based hydrophobic agent. Examples of the silicon-based hydrophobic agent are hexamethyldisilazane, PDMS fluid, and dimethyldichlorosilane.

Each additive may be added to the constituents (A) and (B) in neat form or in the form of an additive masterbatch formulation. The additive masterbatch formulation may comprise a carrier resin, which may be the same as or different than the polyolefin of the (A) polyolefin solids, and a sufficient amount of the additive. The (B) carbon solids and at least one additive may be combined in one and the same masterbatch formulation. E.g., the masterbatch formulation may consist essentially of the (B) carbon solids and the (C) antioxidant.

The manufactured article. The manufactured article made from the homogeneous mixture may comprise a shaped form thereof. Examples are a coating on a substrate, a tape, a film, a layer of a laminate, a foam, and a pipe.

The coated conductor. The manufactured article may be the coated conductor, comprising a conductive core and a polymeric layer at least partially surrounding the conductive core, wherein at least a portion of the polymeric layer comprises the homogeneous mixture, or a cured polymer product of curing same. The entire polymeric layer, or only a portion of the layer, may comprise the cured polymer product.

The conductive core may be linear shape (e.g., like a wire) having a length and proximal and distal ends spaced apart from each other by the length of the linear shape; and the polymeric layer may surround the conductive core except for the proximal and distal ends.

The coated conductor may further comprise one or more additional polymeric layers, which independently may or may not comprise the cured polymer product; and/or an outer shielding layer (e.g., a metal sheath or sleeve). The coated conductor may comprise one or two insulation layers, at least one of which comprises the cured polymer product; alternatively or additionally one or two semiconductive layers, at least one of which comprises the cured polymer product containing a carbon black; alternatively or additionally an outer shielding layer, which comprises the cured polymer product.

High-density polyethylene or HDPE. A polyethylene homopolymer or poly(ethylene-co-1-alkene) copolymer having a density from 0.940 to 0.980 g/cm$^3$, measured according to ASTM D792-13; wherein the 1-alkene comonomer is a $(C_4-C_{20})$1-alkene such as a $(C_4-C_8)$1-alkene such as 1-butene, 1-hexene, or 1-octene.

Low-density polyethylene or LDPE. A poly(ethylene-co-1-alkene) copolymer having a density from 0.871 to less than 0.930 gram per cubic centimeter (g/cm$^3$), measured according to ASTM D792-13; and having significantly lower amount of short chain branches per 1,000 carbon atoms (SCB/1000C) than does LLDPE, wherein SCB/1000C is determined according to the GPC and SCB test methods described later; wherein the 1-alkene comonomer is a $(C_4-C_{20})$1-alkene such as a $(C_4-C_8)$1-alkene such as 1-butene, 1-hexene, or 1-octene.

Linear low-density polyethylene or LLDPE. A poly(ethylene-co-1-alkene) copolymer having a density from 0.871 to less than 0.930 g/cm$^3$, measured according to ASTM D792-13; and having significant amount of short-chain branches per 1,000 carbon atoms (SCB/1000C), wherein SCB/1000C is determined according to the GPC and SCB test methods described later; wherein the 1-alkene comonomer is a $(C_4-C_{20})$1-alkene such as a $(C_4-C_8)$1-alkene such as 1-butene, 1-hexene, or 1-octene.

LLDPEs are made under different process conditions than those used to make LDPEs. LLDPE is compositionally distinct from LDPE and has certain superior properties that have led it to replace LDPE in many commercial applications. These include coatings, films, sheets, and injection molded articles. LLDPE coatings include insulation layers of telecommunications cables. LLDPE films and sheets are used in packaging applications and non-packaging applications. Examples are agricultural film, food packaging, garment bags, grocery bags, heavy-duty sacks, industrial sheeting, pallet and shrink wraps and bags. LLDPE injection molded articles include buckets, freezer containers, lids, and toys.

Liquid means an amorphous state of matter at ambient temperature (e.g., 23° C.) that is intermediate between a gas and a solid and having a stable volume, but not a defined shape.

Liquid additive is used to describe the state of matter of the additive at the temperature of the heterogeneous mixture during the applying acoustic energy step, and does not necessarily require that the additive be a liquid at ambient temperature (e.g., 23° C.) if the temperature of the heterogeneous mixture during the applying acoustic energy step is greater than ambient temperature. In some aspects the liquid additive is a liquid at ambient temperature (e.g., at 23° C.). Solvents are not examples of liquid additives because solvents are used merely to dissolve a solid or liquid additive for contacting with the (A) polyolefin solids and/or the (B) carbon solids, and are intended to be removed from heterogeneous mixture after the contacting step, or later removed from the homogeneous mixture before the homogeneous mixture is used to make a shaped article.

Maintaining temperature of a material below a threshold value. Any passive or active means of preventing how hot or cold the material is from rising to the threshold value. Passive maintaining means may comprise placing the material in a container (e.g., in an acoustic mixer device), wherein the temperature of the container less than the threshold value, and not exposing the container and its contents to a heating source. Active maintaining means may comprise thermally insulating the container or placing the container in effective cooling contact with a heat exchanger device that has a coolant fluid circulating therethrough.

Medium-density polyethylene or MDPE. A poly(ethylene-co-1-alkene) copolymer having a density from 0.930 to less than 0.940 g/cm$^3$, measured according to ASTM D792-13; wherein the 1-alkene comonomer is a $(C_4-C_{20})$1-alkene such as a $(C_4-C_8)$1-alkene such as 1-butene, 1-hexene, or 1-octene.

Melting means changing a material from a solid state of matter to a liquid state of matter. Typically, melting means the changing is complete such that the liquid state of matter contains no unmelted solid form of the material. The temperature of a material at which the material is to be characterized as a solid or a liquid is 20° C.

Polyolefin means any macromolecule comprising constituent units derived from polymerizing an olefin-functional monomer or copolymerizing at least two olefin-functional monomers, or a mixture of such macromolecules. The polyolefin may be amorphous (i.e., having a glass transition temperature but no melting point in differential scanning calorimetry (DSC)) or semi-crystalline (i.e., having a glass transition temperature and a melting point in DSC).

Solid means a state of matter at ambient temperature (e.g., 23° C.) that has a stable volume and defined shape. May be amorphous, crystalline, or semi-crystalline.

Any compound, composition, formulation, material, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements that are inherently required by the compound, composition, formulation, material, mixture, or reaction product (e.g., C and H required by a polyethylene, or C, H, and O required by an alcohol) are not omitted.

Alternatively precedes a distinct embodiment. ANSI is the American National Standards Institute organization headquartered in Washington, D.C., USA. ASME is the American Society of Mechanical Engineers, headquartered in New York City, New York, USA. ASTM is the standards organization, ASTM International, West Conshohocken, Pennsylvania, USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). Periodic Table of the Elements is the IUPAC version of May 1, 2018. May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values. Room temperature: 23°±1° C.

Unless stated otherwise, definitions of terms used herein are taken from the IUPAC Compendium of Chemical Technology ("Gold Book") version 2.3.3 dated Feb. 24, 2014. Some definitions are given below for convenience.

Density: measured according to ASTM D792-13, *Standard Test Methods for Density and Specific Gravity (Relative Density) of Plastics by Displacement*, Method B (for testing solid plastics in liquids other than water, e.g., in liquid 2-propanol). Units of grams per cubic centimeter (g/cm$^3$).

Gel permeation chromatography (GPC) Test Method: number of short chain branches (SCB) per 1000 carbon atoms; Weight-Average Molecular Weight Test Method: determine z-average molecular weight (Mz), weight-average molecular weight (Mw), number average molecular weight (Mn), and Mw/Mn using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 µm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (□L). Prepare the solvent by dissolving 6 g of butylated hydroxytoluene (BHT, antioxidant) in 4 liters (L) of reagent grade 1,2,4-trichlorobenzene (TCB), and filtering the resulting solution through a 0.1 micrometer (µm) Teflon filter to give the solvent. De-gas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min. and allow the DRI detector to stabilize for 8 hours before injecting the first sample. Calculate Mw and Mn using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, a PS=0.67, $K_{PS}$=0.000175, and $a_x$ and $K_x$ are obtained from published literature. For polyethylenes, $a_x/K_x$=0.695/0.000579. For polypropylenes $a_x/K_x$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$□is a constant determined by calibrating the DRI, / indicates division, and dn/dc is the refractive index increment for the polymer. For polyethylene, dn/dc=0.1 09. Calculate mass recovery of polymer from the ratio of the integrated area of the chromatogram of concentration chromatography over elution volume and the injection mass which is equal to the predetermined concentration multiplied by injection loop volume. Report all molecular weights in grams per mole (g/mol) unless otherwise noted. Further details regarding methods of determining Mw, Mn, MWD are described in US 2006/01731 23 page 24-25, paragraphs [0334] to [0341]. Plot of dW/d log(MW) on the y-axis versus Log(MW) on the x-axis to give a GPC chromatogram, wherein Log(MW) and dW/d log(MW) are as defined above.

Melt Index ("$I_2$"): measured according to ASTM D1238-13, using conditions of 190° C./2.16 kg, formerly known as "Condition E". Units of grams per 10 minutes (g/10 min.).

Short Chain Branching is determined using gel permeation chromatography (GPC), where the comonomer content incorporated in the polymers (weight %) is determined by rapid FT-IR spectroscopy on the dissolved polymer in a GPC measurement. For instance, comonomer content is determined with respect to polymer molecular weight by use of an infrared detector such as an IR5 detector in a gel permeation chromatography measurement, as described in Analytical Chemistry 2014, 86(17), 8649-8656. "Toward Absolute Chemical Composition Distribution Measurement of Polyolefins by High-Temperature Liquid Chromatography Hyphenated with Infrared Absorbance and Light Scattering Detectors" by Dean Lee, Colin Li Pi Shan, David M. Meunier, John W. Lyons, Rongjuan Cong, and A. Willem deGroot. Analytical Chemistry 2014 86 (17), 8649-8656.

Examples

Additional inventive embodiments are the preceding aspects, and the claims described later, that describe a range for a process condition and/or a range for a material property, wherein in the additional inventive embodiments an endpoint of the process condition range and/or an endpoint of the material property range, respectively, is amended to any one exemplified process condition value and/or any one exemplified material property value, respectively, described below in this section for any one inventive example.

Polyolefin solids (A)-1: a linear low-density polyethylene (LLDPE-1) that is a poly(ethylene-co-1-butene) copolymer having a unimodal molecular weight distribution, a density of 0.92 g/cc, and a melt index ($I_2$, 190° C., 2.16 kg) of 0.6 to 0.8 g/10 min. May be used in the form of dry pellets or dry granules. The granules may be as obtained from a gas phase polymerization reactor. The pellets are made from the reactor granules and are available as DFDA-7530 NT from The Dow Chemical Company. The pellets may be converted via granulation to granules. Granules were used in IE1 to IE4 (Table 1 below) and the pellets are used in prophetic example IE9 (Table 2 below).

Polyolefin solids (A)-2: a medium-density polyethylene (MDPE-1) that is a poly(ethylene-co-1-hexene) copolymer having a unimodal molecular weight distribution, a density of 0.930 to 0.940 g/cc, and a melt index ($I_2$, 190° C., 2.16 kg) of 0.7 to 0.9 g/10 min. DFH-3580 from The Dow Chemical Company. Used in the form of dry pellets.

Polyolefin solids (A)-3: an LLDPE-2 that is a poly(ethylene-co-1-butene) copolymer having a unimodal molecular weight distribution, a density of 0.922 to 0.924 g/cc, and a melt index ($I_2$, 190° C., 2.16 kg) of 20 g/10 min. (e.g., DNDA-8320 NT-7 from The Dow Chemical Company). Used in the form of pellets.

Polyolefin solids (A)-4 (Prophetic): a low-density poly(ethylene-co-1-hexene) copolymer (LDPE-1) having a density of 0.92 g/cc and a melt index ($I_2$, 190° C., 2.16 kg) of 0.6 to 0.8 g/10 min. Used in the form of dry pellets.

Polyolefin solids (A)-5 (Prophetic): a low-density poly(ethylene-co-1-hexene) copolymer (LDPE-2) having a density of 0.922 to 0.924 g/cc and a melt index ($I_2$, 190° C., 2.16 kg) of 20 g/10 min. Used in the form of pellets.

Carbon Solids (B)-1: a furnace carbon black that is CABOT CSX-362 from Cabot Corporation.

Carbon Solids (B)-2: a powdered graphite.

Carbon Solids (B)-3: carbon nanotubes.

Solid Antioxidant $(C)_{sol}$-1: 3,5-bis(1,1-dimethylethyl)-4-hydroxybenzenepropanoic acid 2,2'-thiodiethanediyl ester having a melting point of 78° C. (e.g., IRGANOX 1035, CAS Number 41484-35-9).

Solid Antioxidant $(C)_{sol}$-2: 4,4'-thiobis(2-t-butyl-5-methylphenol) having a melting point of from 160° to 163° C. (also known as 4,4'-thiobis(6-tert-butyl-m-cresol), CAS No. 96-69-5, e.g., LOWINOX TBM-6.

Solid Stabilizer $(F)_{sol}$-1: a solid heat stabilizer that is a poly(1,2-dihydro-2,2,4-trimethylquinoline) solid having an average molecular weight of 874 g/mol and a softening temperature of 128° C. (CAS No. 26780-96-1; Naugard Super Q).

Solid Processing Aid $(G)_{sol}$-1: a solid fluorinated polyolefin polymer provided as a granular solid and having a melting temperature from 110° to 126° C.; a melt flow index (265° C., 5.0 kg) from 15.0 to 25.0 g/10 min.; a particle size 98% less than 2,400 µm (e.g., 3M Dynamar FX-5912 from 3M Corporation.

Liquid Processing Aid $(G)_{liq}$-1: a mineral oil that is a paraffin liquid having a kinematic viscosity of 33.5 centistokes (cSt).

Liquid Processing Aid $(G)_{liq}$-2: a PDMS fluid having a kinematic viscosity of 50 cSt. XIAMETER PMX-200 silicone fluid from The Dow Chemical Company.

Preparation of Carbon Black Masterbatch 1 (MB1): added 45 weight parts of carbon black (B)-1 and 0.2 weight parts of antioxidant $(C)_{sol}$-2 to 54.8 weight parts of polyolefin solids (A)-3 in a Brabender model Prep mixer equipped with roller blades while mixing contents at a temperature of 180° C. and speed of 15 rotations per minute (rpm). Once all the constituents were added, fluxed the resulting mixture at 40 rpm for 10 minutes to give Carbon Black MB1.

Comparative Example 1 (CE1): prepared sample by melt-mixing (melt-compounding) using a Brabender model Prep mixer equipped with roller blades. Added additive constituents to 200 grams (g) of (A) polyolefin solids and to the carbon black MB1 while mixing contents at a temperature of 180° C. and speed of 15 rotations per minute (rpm). Once all the constituents were added, fluxed the resulting heterogeneous mixture at 40 rpm for 6 minutes to give a melt of a comparative homogeneous mixture. Remove melts from the mixer, and cool to room temperature. Extrude mixtures on 1.9 centimeter (cm, ¾ inch) diameter, 25-1 L/D Brabender extruder, with Maddox mixing head screw, using a strand die. The temperature profile was set at 150°, 170°, 180°, and 190° C. and the screw speed was 40 rpm. The strands were pelletized at room temperature for further processing. Formulation is reported later in Table 1.

Inventive Examples 1 to 4 (IE1 to IE4): each example was made by acoustic mixing in a separate experiment. A total of 150 g of polyethylene granules (A)-1, (A)-2, and (A)-3 were contacted with additives and carbon black in amounts shown in Table 1 to separately make heterogeneous mixtures of IE1 to IE4. Acoustic energy was applied to the heterogeneous mixtures using a Resodyn™ Acoustic Mixer (LabRAM Mixer) at 23° to 26° C. for 3 minutes in a glass jar at a frequency of 60 hertz (Hz) to separately make the homogeneous mixtures of IE1 to IE4. Multiple batches of each homogeneous mixture were made so as to have enough material properties testing and for extruding onto wires. The inventive homogeneous mixtures were separately extruded using a 1.9 cm (¾ inch) Brabender extruder, 25-1 LID, with Maddox mixing head screw, using a strand die. The temperature profile of the extruder was set at 150°, 170°, 180°, and 190° C. and the screw speed was 40 rpm. The strands were pelletized at room temperature for further processing to separately give the homogeneous mixtures of IE1 to IE4 as pellets. Formulations are reported later in Table 1.

The resulting pelletized comparative mixture of CE1 and the inventive homogeneous mixtures of IE1 to IE4 were separately introduced into a wire coating extrusion line (mini-wireline) to make coated wires of CE1 and IE1 to IE4, respectively, as wire constructions on 14 AWG solid copper wire. The wire coating extrusion line consisted of a BRABENDER 1.9 cm extruder with variable speed drive, a 25:1 standard PE screw, a BRABENDER cross-head wire die, lab water cooling trough with air wipe, a laser micrometer and a variable speed wire puller. The samples were extruded at 40 rpm screw speed with 0.76 millimeter (mm, 30 mils) wall thickness. Wires were made using a set temperature profile of 160°/170° C./180° C./190° C. across zone 1/zone 2/zone 3/and head/die, respectively, at a take-up speed of 3.1 meters per minute (10 feet per minute). The surface roughness of each of the wire samples of CE1 and IE1 to IE4, respectively, was quantified using surface profilometry in accordance with ANSI/ASME B46.1. The average roughness was measured using a Mitutoyo SJ-400 surface roughness meter. Data are reported later in Table 1.

Compression molded plaques of the comparative mixture of CE1 and the homogeneous mixtures of IE1 to IE4 were prepared to use as specimens for tensile and elongation (T&E) testing. The pelleted homogeneous mixtures were separately compression molded using a WABASH Genesis Steam press (with quench cooling capability) operated in the manual mode. The press was preheated to 180°±5° C. A total of 75 grams of pellets were pre-weighed and placed in the center of a 1.9 mm (75 mils) stainless steel plaque between the mold assembly made up of mylar and aluminum sheets. The resulting filled mold was then placed into the press at 3.45 megapascals (Mpa, 500 pounds per square inch (psi)) for 5 minutes. After this initial press, the pressure was increased to 17.2 Mpa (2,500 psi) for 5 minutes. The samples were cooled at a cooling rate of 10° C. per minute. The cooled samples were taken out after they reached 35° C. to give the compression molded plaques of IE1 to IE4 and CE1. From the plaques were cut 5 Type IV dog-bones, where were tensile tested per ASTM D638-03 after first being conditioned for 48 hours in a controlled air atmosphere at 23.0° C. (73.4 degrees Fahrenheit (° F.)) with 50% relative humidity. The tensile testing was conducted on an Instron Renew 4201 65/16 apparatus using a 50.8 cm per minute (20 inches per minute) jaw separation speed. Data are reported below in Table 1.

TABLE 1

Homogeneous Mixtures and Properties of Examples.

| Homogeneous Mixtures (wt %) (* melt compounded or ^ acoustic mixed) | CE1* | IE1^ | IE2^ | IE3^ | IE4^ |
|---|---|---|---|---|---|
| Polyolefin Solids (A)-1 (LLDPE-1, 0.7 MI) | 93.93 | 93.93 | 93.75 | 93.43 | 93.73 |
| Polyolefin Solids (A)-2 (MDPE-1) | 0 | 0 | 0 | 0 | 0 |
| Polyolefin Solids (A)-2 (LLDPE-2, 20 MI) | 3.17 | 3.17 | 3.17 | 3.17 | 3.17 |
| Solid Stabilizer $(F)_{sol}$-1 (SUPER Q) | 0.2 | 0.2 | 0.2 | 0.2 | 0.2 |
| Solid Antioxidant $(C)_{sol}$-1 (IRGANOX 1035) | 0.07 | 0.07 | 0.07 | 0.07 | 0.07 |
| Solid Processing Aid $(G)_{sol}$-1 (Dynamar FX-5912) | 0.017 | 0.017 | 0.0008 | 0.017 | 0.017 |
| Solid Antioxidant $(C)_{sol}$-2 (LOWINOX TBM-6) | 0.012 | 0.012 | 0.012 | 0.012 | 0.012 |
| Carbon Black (B)-1 (furnace black CABOT CSX-362) | 2.6 | 2.6 | 2.6 | 2.6 | 2.6 |
| Liquid Processing Aid $(G)_{liq}$-1 (mineral oil) | 0 | 0 | 0.2 | 0.5 | 0 |
| Liquid Processing Aid $(G)_{liq}$-1 (silicone oil) | 0 | 0 | 0 | 0 | 0.2 |
| Total (wt %) | 100.0 | 100.0 | 100.0 | 100.0 | 100.0 |
| Tensile stress (Mpa) | 16.2* | 16.3 | 13.9 | 13.7 | N/m |
| Std | N/r | 98 | 371 | 249 | N/a |
| Elongation-at-break (%) | 700 | 661 | 593 | 616 | N/m |
| Std | N/r | 20 | 128 | 133 | N/a |
| Wire surface roughness (units?) | 42.8 | 40.8 | 28.1 | N/m | 18.2 |
| Std | 12.7 | 11.4 | 18.4 | N/a | 10.3 |

*reported. N/m not measured. N/a not applicable. N/r not reported.

In Table 1, the inventive examples show it is possible to prepare polyolefin compositions with the levels of carbon solids that are typically used in ultraviolet-blocking amounts in coating layers of telecommunications cables. The coating layers have good mechanical properties. In addition, the surface smoothness values of the coated wires made with the inventive homogeneous compositions are comparable to the comparative mixture. The lower the wire surface roughness number, the smoother (less rough) is the wire's surface. The comparative mixture is based on commercial formulation made via a two-step masterbatch method. The good surface smoothness (low surface roughness) of the inventive coated wires indicates good dispersion of the raw carbon black agglomerates of carbon solids (B)-1 was satisfactorily achieved. The surface roughness values as measure by a profilometer also show that the addition of a relatively low level of oil enhances significantly the ability of the acoustic mixer to uniformly mix the carbon black particles.

Prophetic Inventive Examples 5 to 8 (IE5 to IE8): replicate the procedure of IE1 except instead of using 150 g of polyethylene granules (A)-1 use 150 g of polyethylene granules (A)-2 and/or (A)-3 to make homogeneous mixtures of IE5 to IE8 having the formulations shown below in Table 2.

Prophetic Inventive Example 9 (IE9): replicate the procedure of IE1 except instead of using granules of LLDPE-1 use pellets of LLDPE-1 and instead of the (B)-1 carbon black use (B)-2 powdered graphite or carbon nanotubes so to make a homogeneous mixture of IE9 having the formulation shown below in Table 2.

TABLE 2

Prophetic Inventive Homogeneous Mixtures.

| Homogeneous Mixtures (wt %) (make by acoustic mixing) | IE5 | IE6 | IE7 | IE8 | IE9 |
|---|---|---|---|---|---|
| Polyolefin Solids (A)-4 (LDPE-1, 0.7 MI) | 54.93 | 0 | 93.43 | 3.37 | 0 |
| Polyolefin Solids (A)-2 (MDPE-1) | 30.00 | 93.75 | 3.37 | 0 | 0 |
| Polyolefin Solids (A)-5 (LDPE-2, 20 MI) | 9.20 | 3.37 | 0 | 93.73 | 0 |
| Polyolefin Solids (A)-1 (LLDPE-1, 0.7 MI) | 0 | 0 | 0 | 0 | 93.7 |
| Polyolefin Solids (A)-2 (LLDPE-2, 20 MI) | 0 | 0 | 0 | 0 | 3.17 |
| Solid Stabilizer $(F)_{sol}$-1 (SUPER Q) | 0 | 0 | 0 | 0 | 0.2 |
| Solid Antioxidant $(C)_{sol}$-1 (IRGANOX 1035) | 0.07 | 0.07 | 0.07 | 0.07 | 0.07 |
| Solid Processing Aid $(G)_{sol}$-1 (Dynamar FX-5912) | 0.017 | 0.0008 | 0.017 | 0.017 | 0.017 |
| Solid Antioxidant $(C)_{sol}$-2 (LOWINOX TBM-6) | 0.012 | 0.012 | 0.012 | 0.012 | 0.012 |
| Carbon Black (B)-1 (furnace black CABOT CSX-362) | 2.6 | 2.6 | 2.6 | 2.6 | 0 |
| Powdered Graphite (B)-2 or Carbon Nanotubes (B)-3 | 0 | 0 | 0 | 0 | 2.6 |
| Liquid Processing Aid $(G)_{liq}$-1 (mineral oil) | 0 | 0.2 | 0.5 | 0 | 0 |
| Liquid Processing Aid $(G)_{liq}$-1 (silicone oil) | 0 | 0 | 0 | 0.2 | 0.2 |
| Total (wt %) | 100.0 | 100.0 | 100.0 | 100.0 | 100.0 |

The prophetic examples of Table 2 are intended to show that the inventive applying acoustic energy step may be used to make homogeneous mixtures of (A) polyolefin solids and (B) carbon solids and additives wherein the (A) polyolefin solids would not be limited to the choices of materials used in working examples IE1 to IE4.

The invention claimed is:

1. A method of making a homogeneous mixture of polyolefin solids and carbon solids without melting the polyolefin solids during the making, the method comprising applying acoustic energy at a frequency of from 20 to 100 hertz (Hz) to a heterogeneous mixture comprising (A) polyolefin solids and (B) carbon solids for a period of time sufficient to substantially intermix the (A) polyolefin solids and the (B) carbon solids together while maintaining temperature of the heterogeneous mixture below the melting temperature of the (A) polyolefin solids, thereby making the homogeneous mixture without melting the (A) polyolefin solids; wherein the (A) polyolefin solids are from 95.0 to 99.9 weight percent (wt %) and the (B) carbon solids are from 0.1 to 5.0 wt %, respectively, of the combined weights of the constituents (A) and (B).

2. The method of claim 1 wherein the applying acoustic energy step is characterized by any one of limitations (i) to (v): (i) the frequency is from 50 to 70 Hz; (ii) the period of time is from 1 minute to 10 minutes; (iii) both (i) and (ii); (iv) the maintaining temperature of the heterogeneous mixture below the melting temperature of the (A) polyolefin solids comprises maintaining temperature of the heterogeneous mixture at from −20.0° to 50.0° C.; and (v) both (iv) and any one of (i) to (iii).

3. The method of claim 1 wherein the (A) polyolefin solids are characterized by a physical form that is a powder, granules, pellets, or a blend of any two or more thereof, and by a melting temperature that is from 61° to 180° C.; and the (B) carbon solids are characterized by a physical form that is a powder, granules, fibers, tubes, or a blend of any two or more thereof, and by a melting temperature that is from 2,400° to 4,400° C.

4. The method of claim 1 characterized by any one of limitations (i) to (iii): (i) the polyolefin of the (A) polyolefin solids consists essentially of one or more ethylene-based polymers; (ii) the (B) carbon solids are graphite, carbon black, carbon nanotubes, or a blend of any two or more thereof; and (iii) both (i) and (ii).

5. The method of claim 4 wherein the ethylene-based polymer is a linear low-density polyethylene (LLDPE) or a combination of two different LLDPEs; and wherein the (B) carbon solids are carbon black.

6. The method of claim 1 wherein the heterogeneous mixture further comprises one or more additives that is/are not the (A) polyolefin solids or the (B) carbon solids, and the applying acoustic energy step comprises applying acoustic energy at a frequency of from 20 to 100 hertz (Hz) to the heterogeneous mixture comprising the (A) polyolefin solids, the (B) carbon solids, and the one or more additives for a period of time sufficient to substantially intermix the (A) polyolefin solids, the (B) carbon solids, and the one or more additives together while maintaining temperature of the heterogeneous mixture below the melting temperature of the (A) polyolefin solids, thereby making the homogeneous mixture further comprising the one or more additives, without melting the (A) polyolefin solids.

7. The method of claim 4 characterized by any one of limitations (i) to (v): (i) the (A) polyolefin solids comprises a particle blend of first solids of a first linear low-density polyethylene (first LLDPE) and second solids of a second LLDPE that is different than the first LLDPE; (ii) the (B) carbon solids comprise a carbon black; (iii) the one or more additives comprise one or two particulate solid (C) antioxidants; (iv) the one or more additives comprise a particulate solid (F) heat stabilizer; and (v) the one or more additives comprise one or two (G) processing aids independently selected from a particulate solid (G) processing aid and a (G) liquid processing aid.

8. The method of claim 1 further comprising a step of melting the (A) polyolefin solids of the homogeneous mixture to make a homogeneous melt mixture comprising the (B) carbon solids, one or more additives, if present, and a melt of the (A) polyolefin solids; shaping the homogeneous melt mixture to give a shaped melt mixture; and cooling the shaped melt mixture to give a shaped solid.

9. The method of claim 8 wherein the shaping step comprises extruding the melt mixture as a coating onto a conductive core, and allowing the coating to solidify to make a coated conductor comprising the conductive core and a coating-shaped solid at least partially covering the conductive core.

10. A coated conductor made by the method of claim 9.

* * * * *